(12) United States Patent
Huang (10) Patent No.: US 6,409,410 B1
(45) Date of Patent: Jun. 25, 2002

(54) COUPLER FOR SPORT PRACTICE NET RACK

(76) Inventor: Kuang Hui Huang, No. 91, Ai-Kuo Street, Feng-Yuan City (TW)

( * ) Notice: Subject to any disclaimer, the term of this patent is extended or adjusted under 35 U.S.C. 154(b) by 0 days.

(21) Appl. No.: 09/678,250

(22) Filed: Oct. 4, 2000

(51) Int. Cl.[7] .............................................. F16C 11/00

(52) U.S. Cl. ........................ 403/65; 403/329; 403/112; 403/119

(58) Field of Search ................... 248/222.11, 222.13, 248/222.51, 291.1; 403/329, 112, 113, 119, 326, 321, 84, 83, 81, 65, 102, 205, 403; 285/179; 273/400

(56) References Cited

U.S. PATENT DOCUMENTS

| | | | | |
|---|---|---|---|---|
| 5,431,411 A | * | 7/1995 | Padilla ........................ | 273/400 |
| 5,539,957 A | * | 7/1996 | Schmidt ................. | 403/102 X |
| 5,566,952 A | * | 10/1996 | Mullin et al. ................ | 273/400 |
| 5,681,045 A | * | 10/1997 | Liao ........................ | 403/102 X |

\* cited by examiner

*Primary Examiner*—Lynne H. Browne
*Assistant Examiner*—John R. Cottingham
(74) *Attorney, Agent, or Firm*—Charles E. Baxley (57) ABSTRACT

A coupler for a sport practice net rack includes a first angular tube having a first flat section and a first angular section, and a second angular tube pivotally mounted on the first angular tube and having a second flat section and a second angular section. The second angular section of the second angular tube is detachably received in the first angular section of the first angular tube.

4 Claims, 13 Drawing Sheets

COUPLER FOR SPORT PRACTICE NET RACK

BACKGROUND OF THE INVENTION

1. Field of the Invention

The present invention relates to a coupler, and more particularly to a coupler for a sport practice net rack.

2. Description of the Related Art

Figure 12:
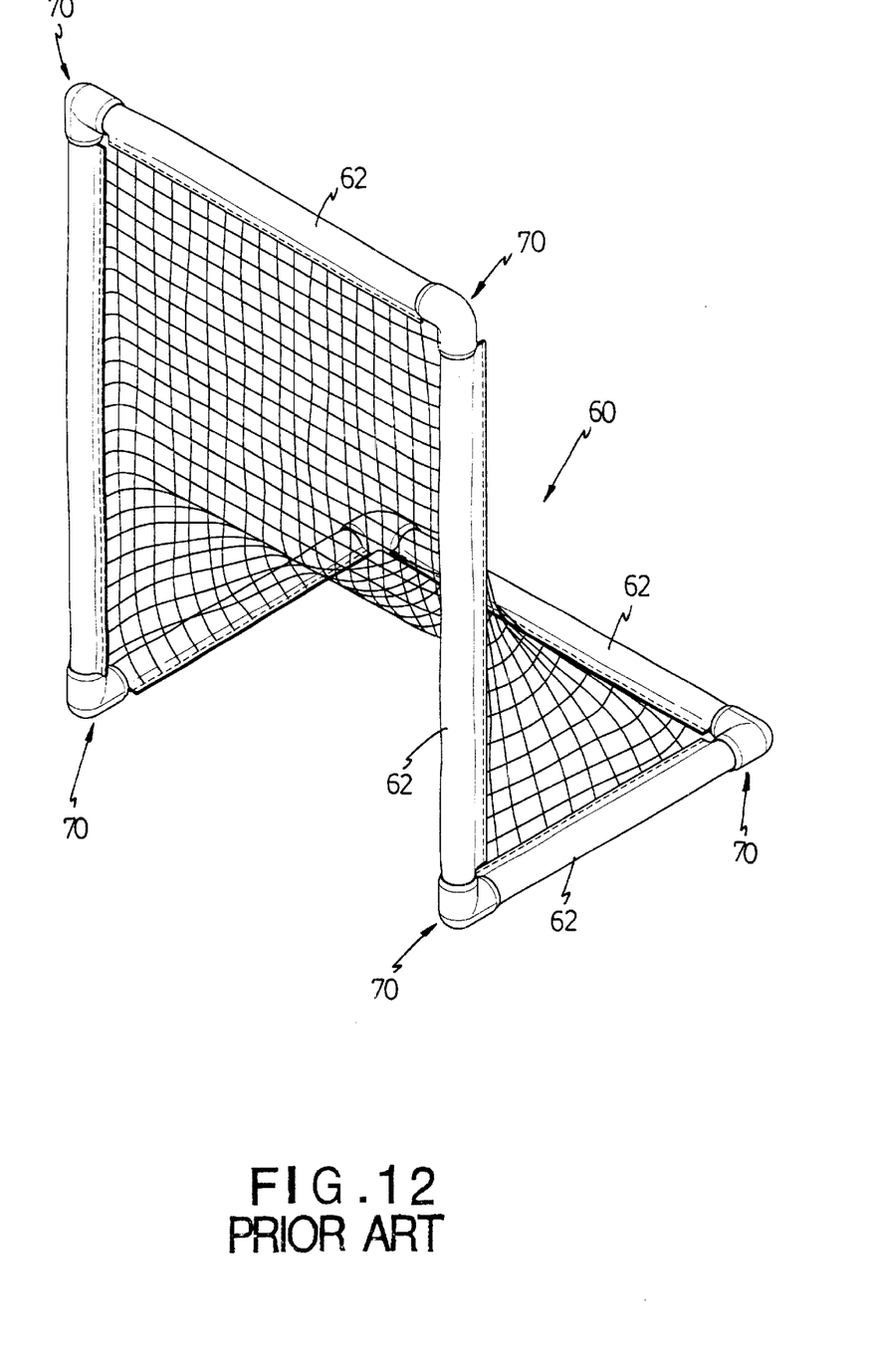
FIG. 12 is a perspective view of a conventional sport practice net rack in accordance with the prior art.
Figure 13:
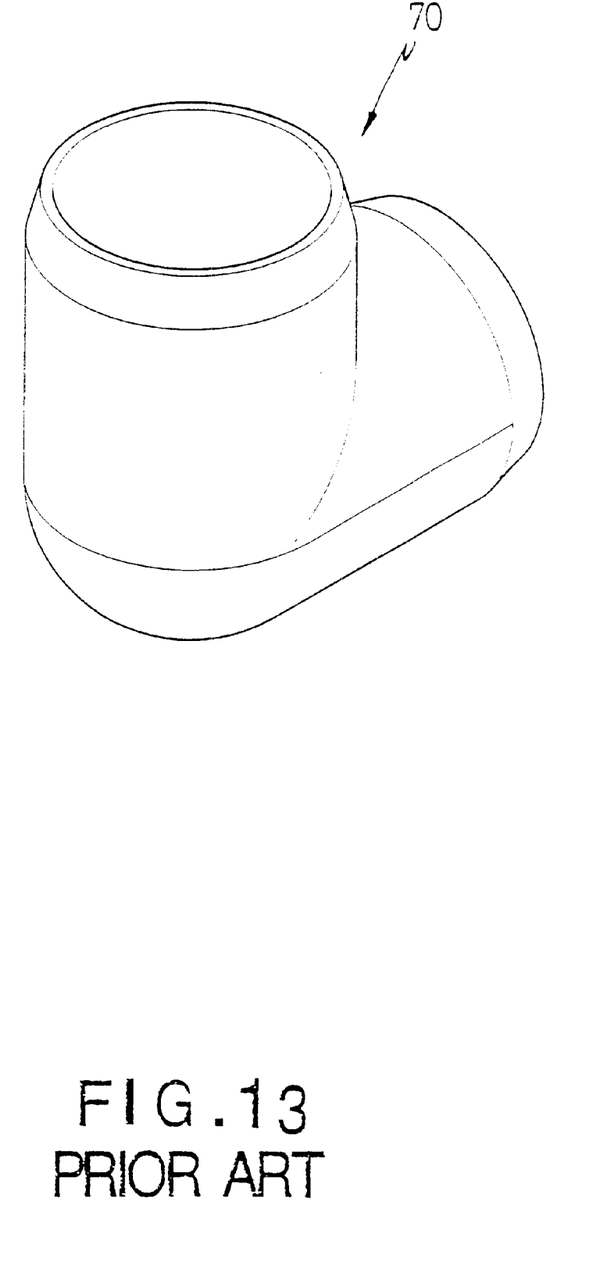
FIG. 13 is a perspective view of a conventional coupler for a sport practice net rack in accordance with the prior art.

A conventional coupler 70 in accordance with the prior art shown in FIGS. 12 and 13 can be used for co-operating with a sport practice net rack 60. In practice, a plurality of couplers 70 are used to connect the support rods 62 of the sport practice net rack 60, thereby fully expanding the sport practice net rack 60 so that a user can use the sport practice net rack 60 for practice use. However, each of the couplers 70 has a fixed structure so that the user has to detach each of the couplers 70 from the support rods 62 the sport practice net rack 60 respectively so as to fold the sport practice net rack 60, thereby causing inconvenience to the user. In addition, the couplers 70 and the support rods 62 of the sport practice net rack 60 occupy much space when being folded, thereby greatly wasting the storing space. Further, the sport practice net rack 60 cannot be easily and quickly assembled and dismantled, thereby causing inconvenience to the user. Further, the couplers 70 and the support rods 62 of the sport practice net rack 60 are not portable when being folded, thereby decreasing the versatility of the sport practice net rack 60.

SUMMARY OF THE INVENTION

The present invention has arisen to mitigate and/or obviate the disadvantage of the conventional coupler for a sport practice net rack.

In accordance with one aspect of the present invention, there is provided a coupler for a sport practice net rack comprising: a first angular tube having a first flat section and a first angular section; and a second angular tube pivotally mounted on the first angular tube and having a second flat section and a second angular section, the second angular section of the second angular tube detachably received in the first angular section of the first angular tube.

The first angular section of the first angular tube defines a locking slot therein. and the second angular section of the second angular tube includes an elongated flexible piece having a press button protruding outward therefrom and detachably secured in the locking slot of the second angular section of the first angular tube. The first angular section of the second angular tube defines two elongated slits spaced from each other, thereby defining the elongated flexible piece.

The second flat section of the second angular tube is provided with an annular shoulder, and the first angular section of the first angular tube has an abutting edge rested on the annular shoulder of the second flat section of the second angular tube when the press button of the flexible piece of the second angular section of the second angular tube is secured in the locking slot of the first angular section of the first angular tube.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1–5, a coupler 10 in accordance with the present invention is used for a sport practice net rack 40 and comprises a first angular tube 20 having a first flat; section 21 and a first angular section 22, and a second angular tube 30 pivotally mounted on the first angular tube 20 and having a second flat section 31 and a second angular section 32, wherein the second angular section 32 of the second angular tube 30 is detachably received in the first angular section 22 of the first angular tube 20.

Figure 3:
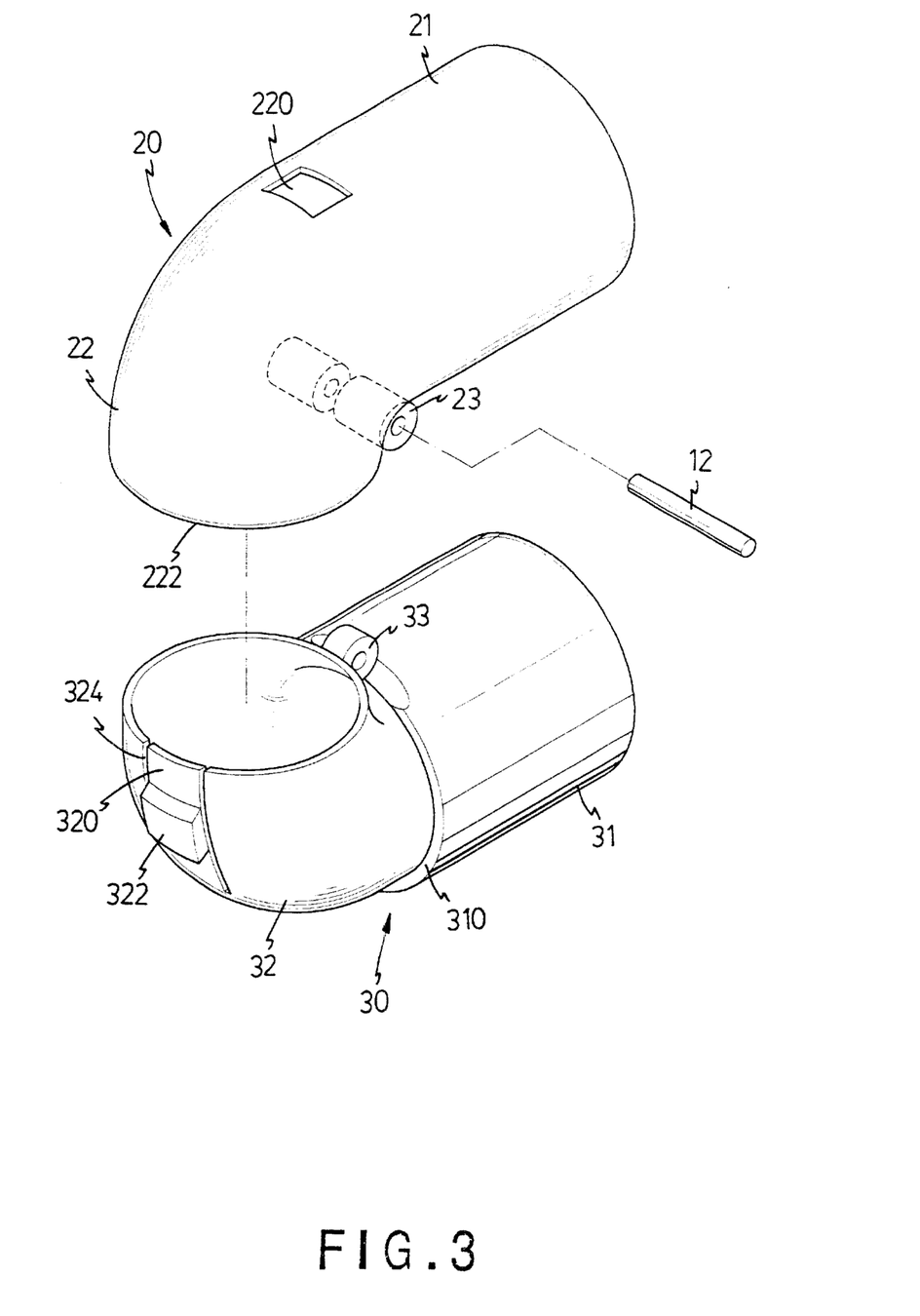
FIG. 3 is an exploded view of the coupler as shown in FIG. 2.

The first angular section 22 of the first angular tube 20 defines a locking slot 220 therein, and the second angular section 32 of the second angular tube 30 includes an elongated flexible piece 320 having a press button 322 protruding outward therefrom and detachably secured in the locking slot 220 of the first angular section 22 of the first angular tube 20. The second angular section 32 of the second angular tube 30 defines two elongated slits 324 spaced from each other, thereby defining the elongated flexible piece 320.

Figure 4:
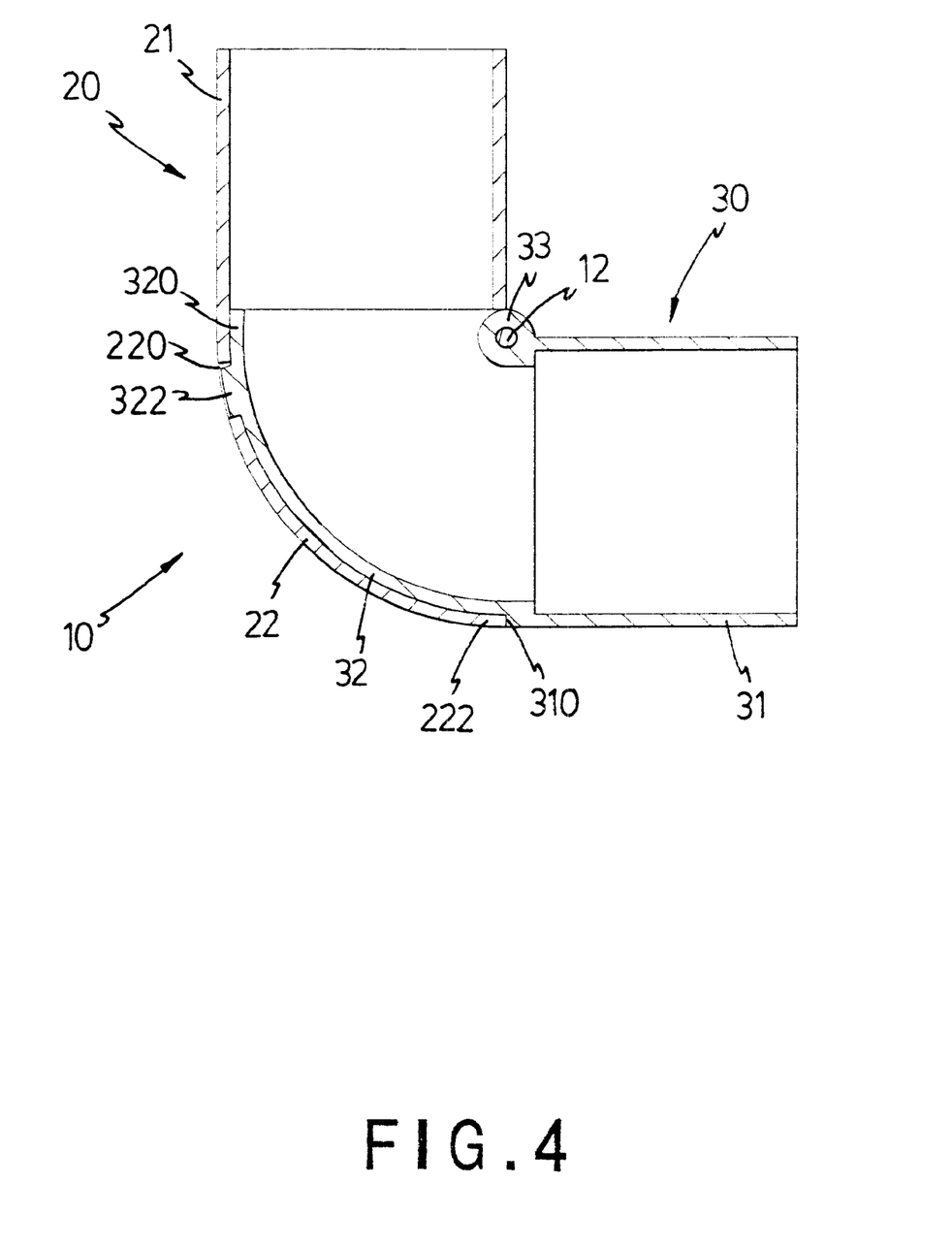
FIG. 4 is a front plan cross-sectional expanding, view of the coupler as shown in FIG. 2.

The second flat section 31 of the second angular tube 30 is formed with an annular shoulder 310, and the first angular section 22 of the first angular tube 20 has an abutting edge 222 rested on the annular shoulder 310 of the second flat section 31 of the second angular tube 30 when the press button 322 of the flexible piece 320 of the second angular section 32 of the second angular tube 30 is secured in the locking slot 220 of the first angular section 22 of the first angular tube 20 as shown in FIG. 4.

The first angular tube 20 includes two spaced support ears 23, the second angular tube 30 includes a pivot ear 33 pivotally mounted between the two support ears 23, and the coupler 10 further comprises a pivot axle 12 extending through the two support ears 23 and the pivot ear 33 so that the second angular tube 30 is pivotally mounted on the first angular tube 20.

Figure 1:
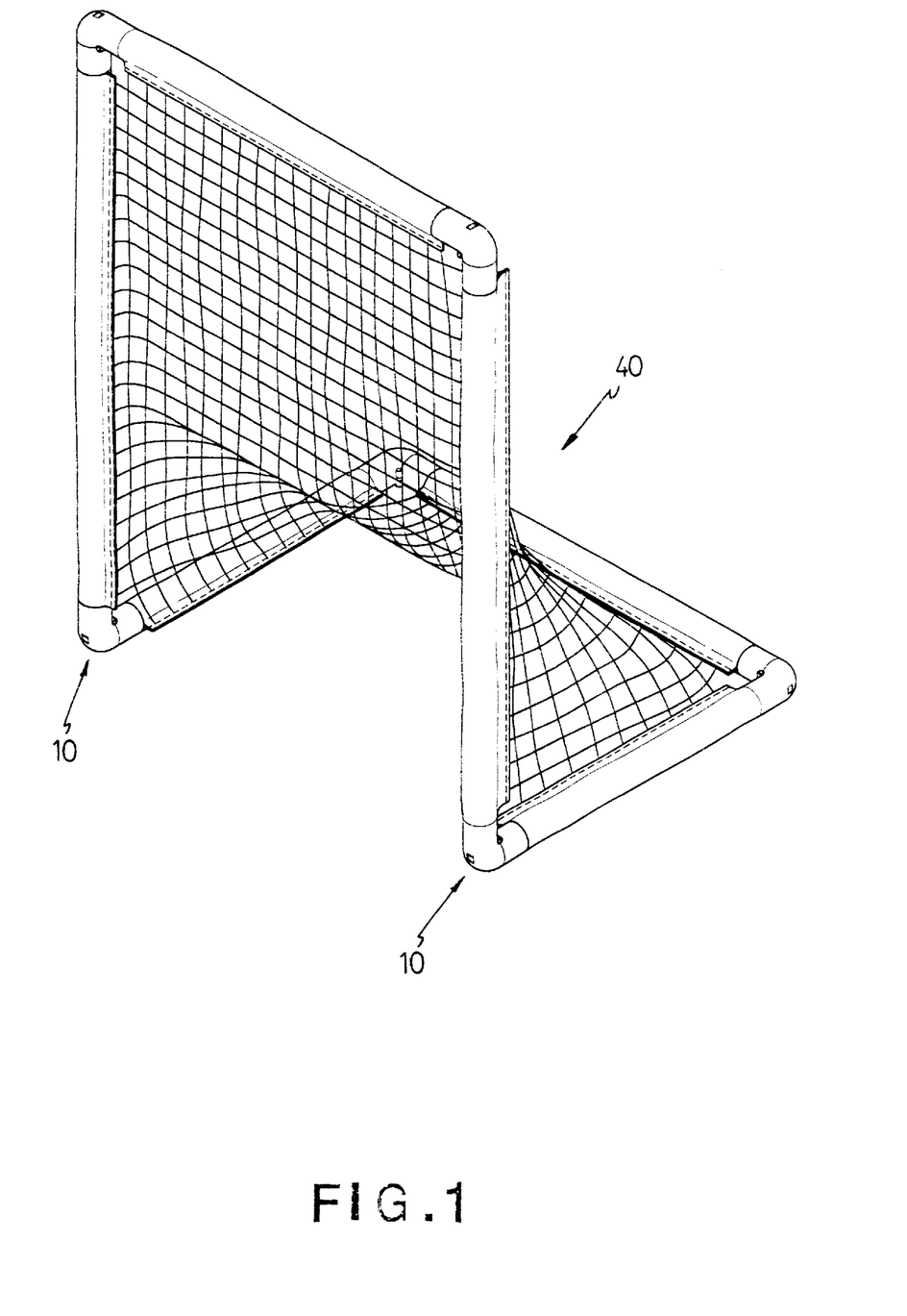
FIG. 1 is a perspective view of a sport practice net rack in accordance with the present invention.

In operation, the press button 322 of the flexible piece 320 of the second angular section 32 of the second angular tube 30 is initially secured in the locking slot 220 of the first angular section 22 of the first angular tube 20 while the abutting edge 222 of the first angular section 22 of the first angular tube 20 is rested on the annular shoulder 310 of the second flat section 31 of the second angular tube 30 as shown in FIG. 4 so that the first flat section 21 of the first angular tube 20 is perpendicular to the second flat section 31 of the second angular tube 30, thereby expanding the coupler 10 for supporting the sport practice net rack 40 as shown in FIG. 1.

Figure 2:
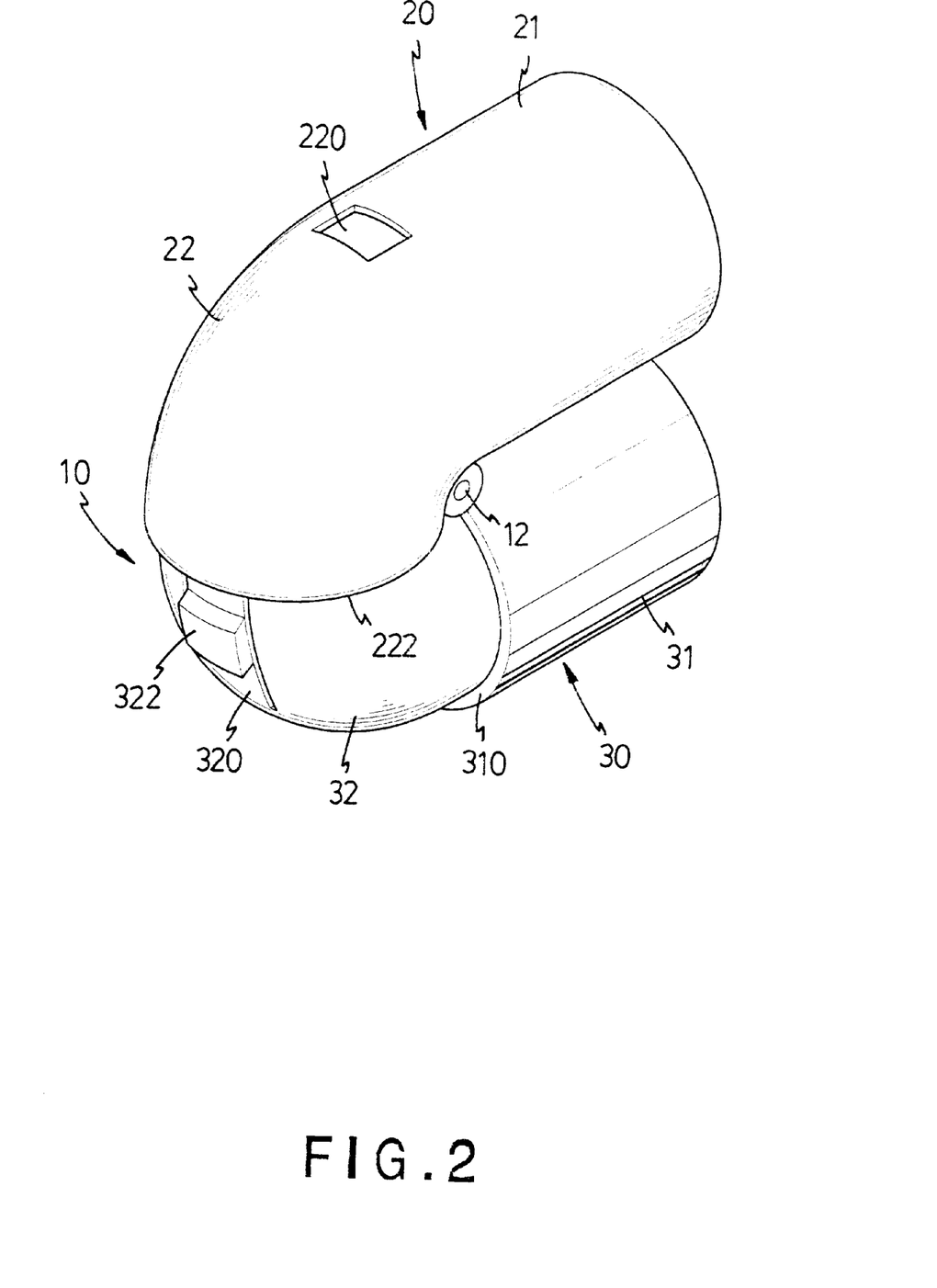
FIG. 2 is a perspective view of a coupler for a sport practice net rack in accordance with the present invention.
Figure 5:
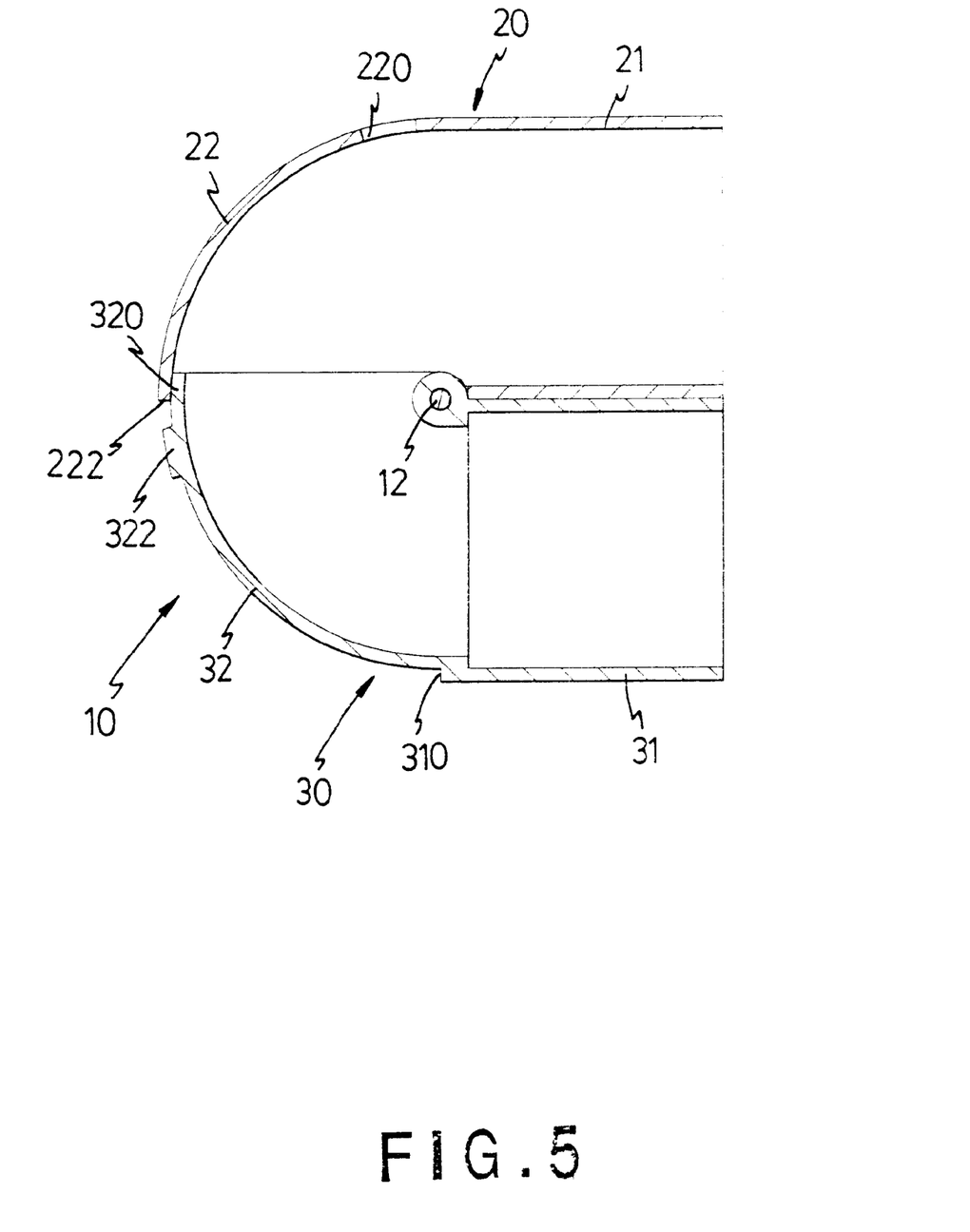
FIG. 5 is an operational view of the coupler as shown in FIG. 4.

The press button 322 of the flexible piece 320 can then be pressed to press the flexible piece 320 inward, thereby detaching the press button 322 from the locking slot 220 whereby the first angular tube 20 can be pivoted relative to the second angular tube 30 about the pivot axle 12 from the position as shown in FIG. 4 to the position as shown in FIG. 5 so that the first flat section 21 of the first angular tube 20 is parallel with the second flat section 31 of the second angular tube 30, thereby folding the coupler 10 as shown in FIG. 2.

Figure 6:
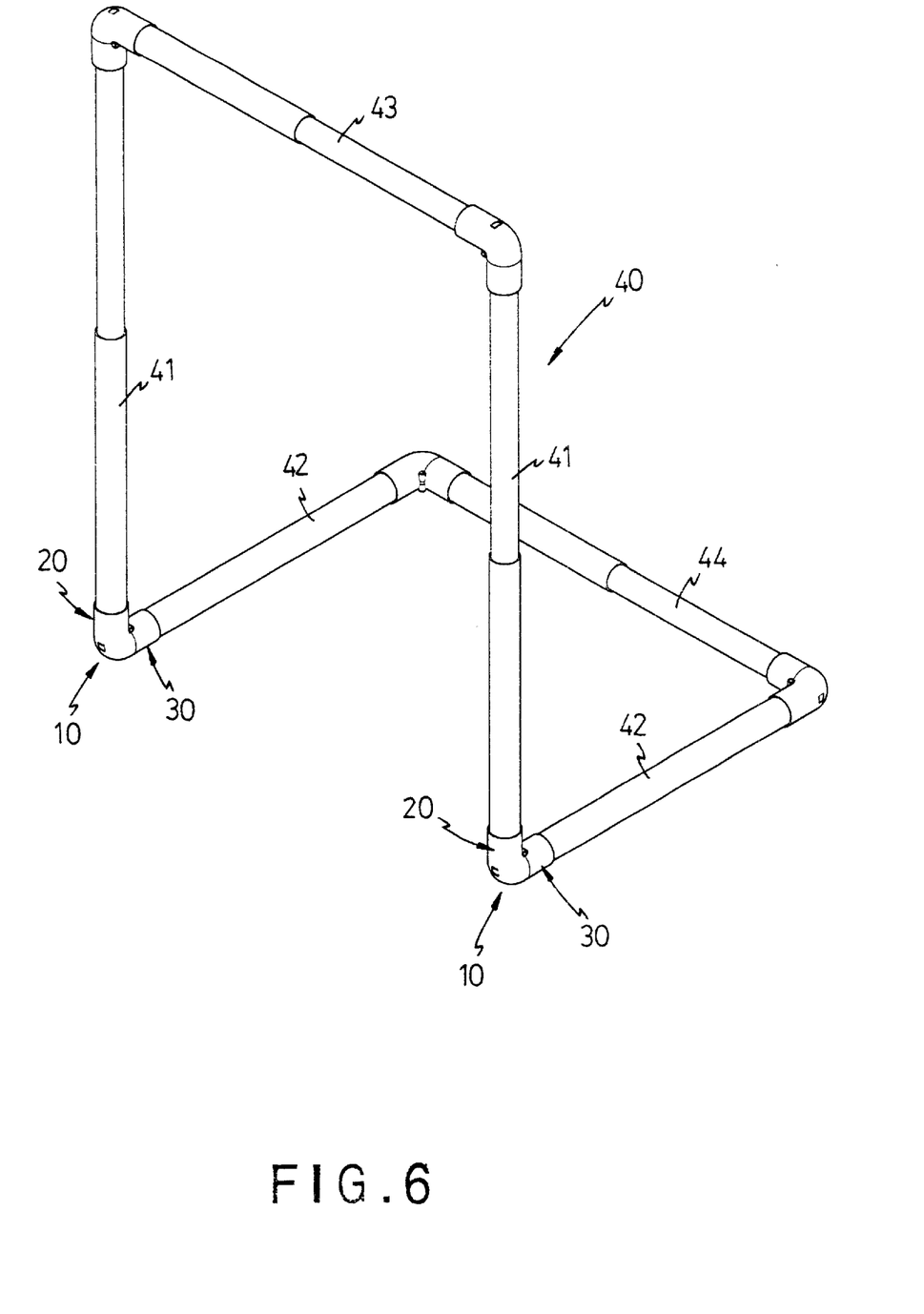
FIG. 6 is a perspective view of the sport practice net rack as shown in FIG. 1.
Figure 7:
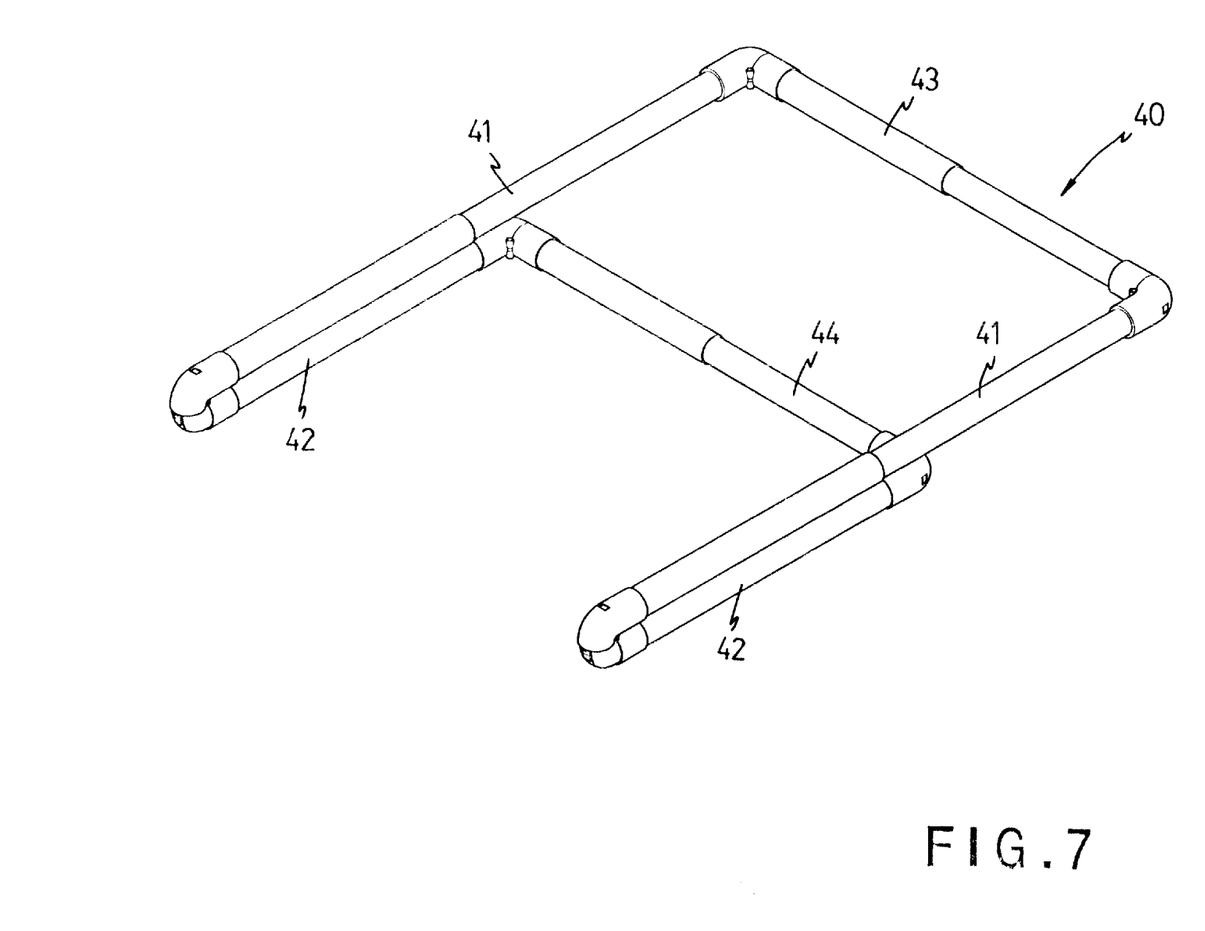
FIG. 7 is an operational view of the sport practice net rack as shown in FIG. 6.
Figure 8:
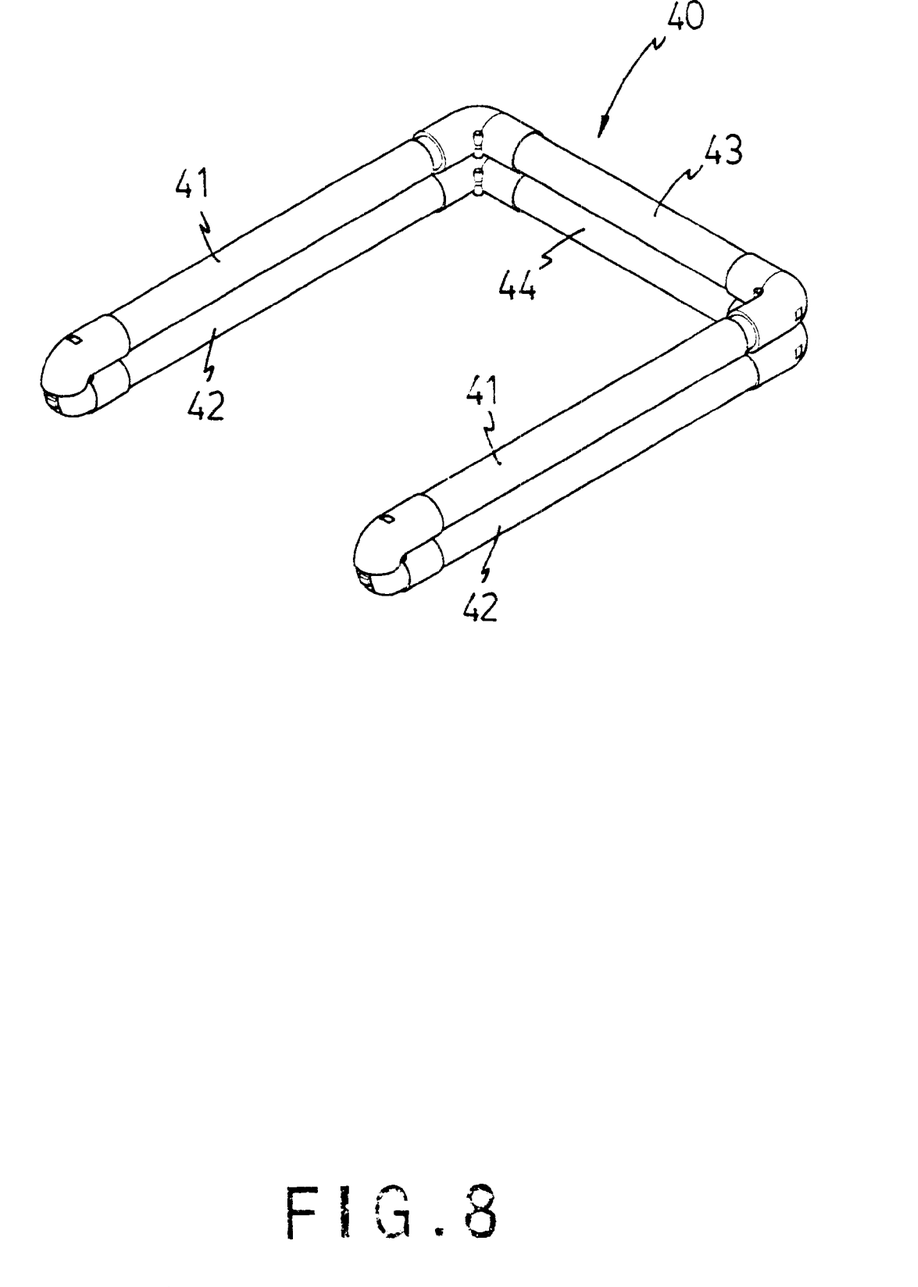
FIG. 8 is an operational view of the sport practice net rack as shown in FIG. 7.

In practice, referring to FIGS. 6–8 with reference to FIG. 1, the sport practice net rack 40 includes two telescopic upright support tubes 41, two fixed horizontal support tubes 42, a telescopic top tube 43, and a telescopic bottom tube 44. A plurality of couplers 10 can be fully expanded to connect the upright support tubes 41, the horizontal support tubes 42, the top tube 43, and the bottom tube 44 as shown in FIG. 6.

Two of the couplers 10 can then folded so as to move the upright support tubes 41 and the top tube 43 downward from the position as shown in FIG. 6 to the position as shown in FIG. 7.

The upright support tubes 41, the top tube 43, and the bottom tube 44 are then in turn retracted from the position as shown in FIG. 7 to the position as shown in FIG. 8, thereby fully folding the sport practice net rack 40.

Accordingly, the coupler 10 of the present invention can be used to fully fold the sport practice net rack 40, whereby the volume of the sport practice net rack 40 can be reduced to the minimum when not in use so that the sport practice net rack 40 does not occupy much space when being folded, thereby greatly saving the space. in addition, the sport practice net rack 40 can be easily and quickly assembled and dismantled by using the coupler 10 of the present invention, thereby facilitating the user employing the sport practice net rack 40. Further, the sport practice net rack 40 together with the couplers 10 is portable when being fully folded, thereby greatly increasing the versatility and convenience of the sport practice net rack 40.

Figure 9:
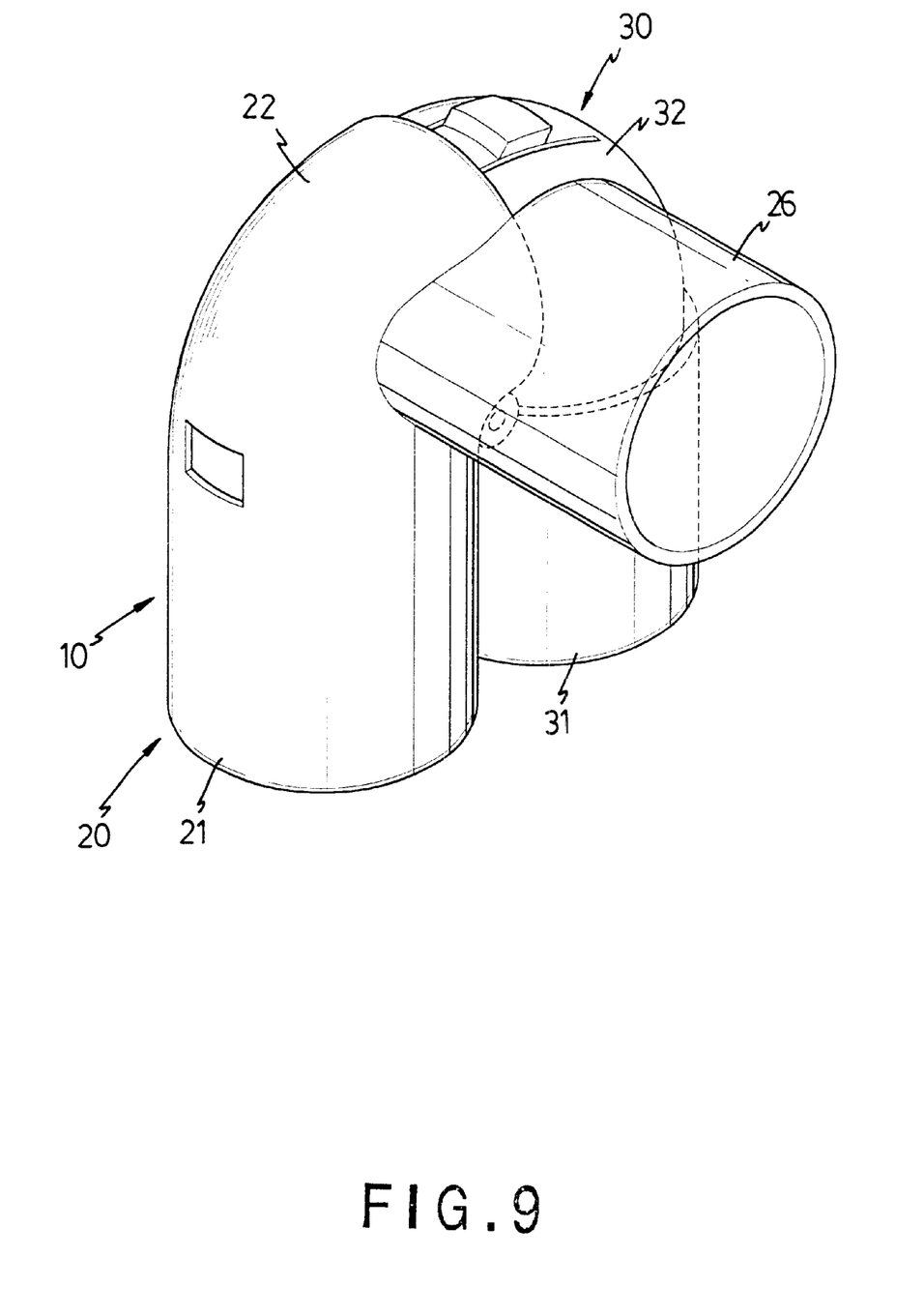
FIG. 9 is a perspective view of a sport practice net rack in accordance with another embodiment of the present invention.
Figure 10:
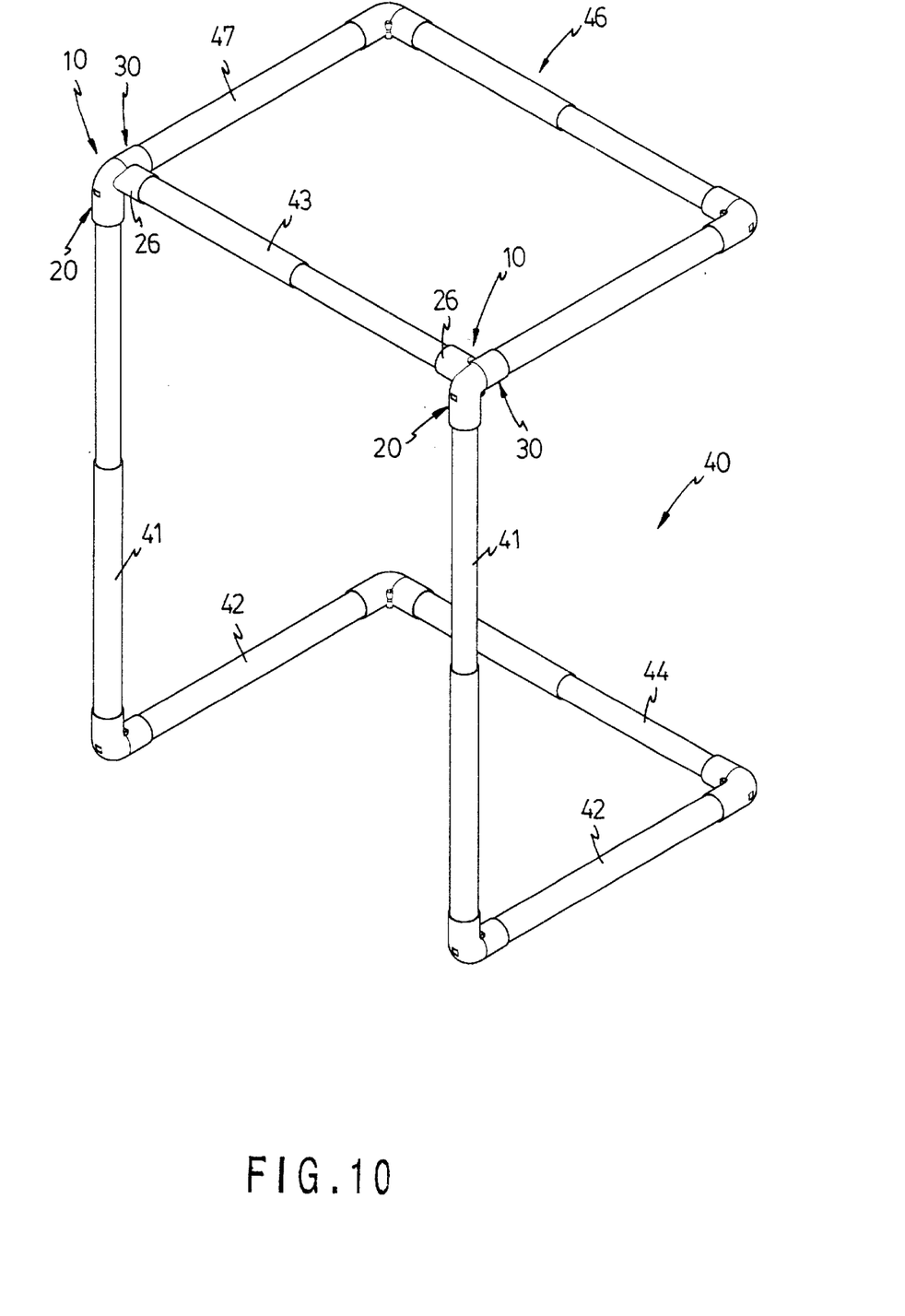
FIG. 10 is a schematic view of the sport practice net rack as shown in FIG. 9.
Figure 11:
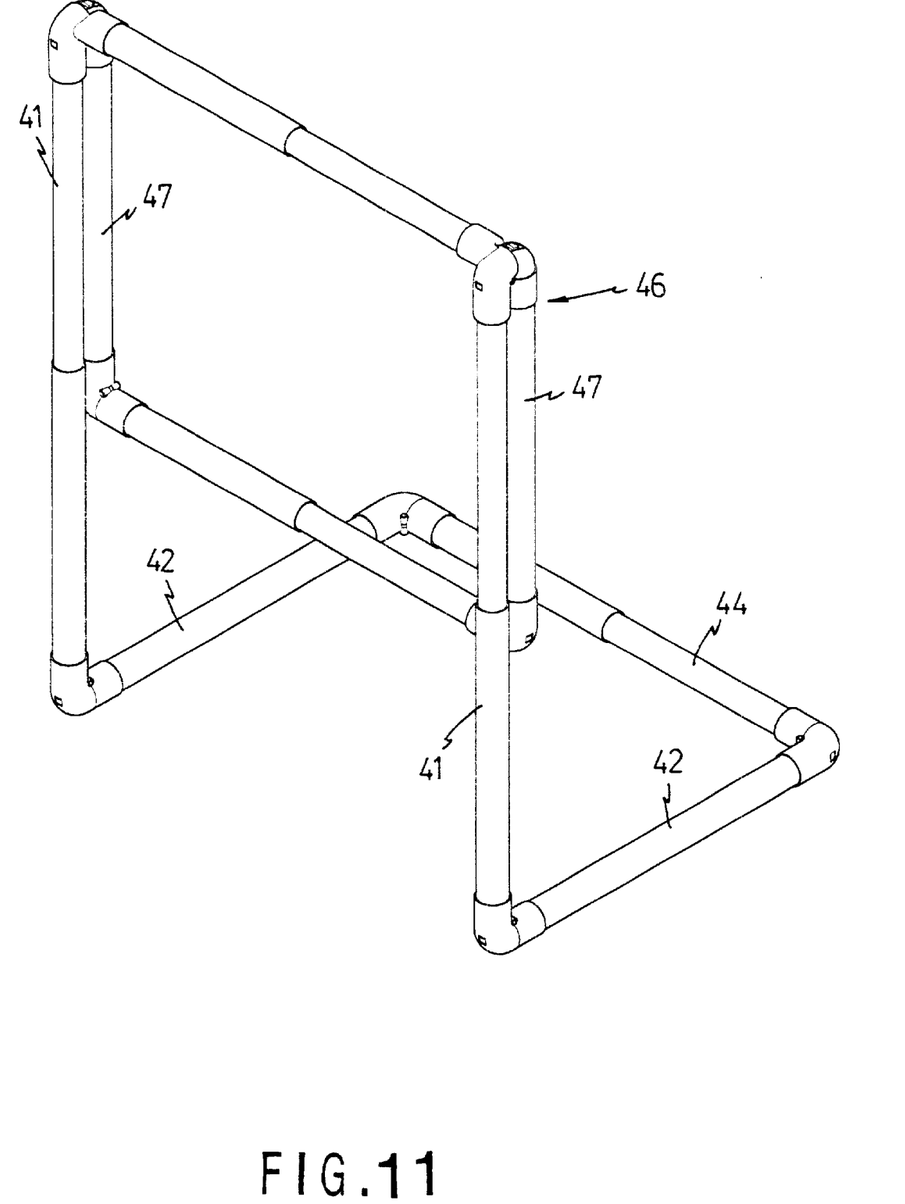
FIG. 11 is an operational view of the sport practice net rack as shown in FIG. 10.

Referring to FIGS. 9–11, a coupler 10 in accordance with another embodiment of the present invention is used for a sport practice net rack 40 and comprises a first angular tube 20 having a first flat section 21 and a first angular section 22, a second angular tube 30 pivotally mounted on the first angular tube 20 and having a second flat section 31 and a second angular section 32, and an extension tube 26 integrally extending from the first annular section 22 of the first angular tube 20, wherein the second angular section 32 of the second angular tube 30 is detachably received in the first angular section 22 of the first angular tube 20.

The sport practice net rack 40 includes two telescopic upright support tubes 41, two fixed horizontal support tubes 42, a telescopic top tube 43, a telescopic bottom tube 44, and an upper frame 46 including two support tubes 47. A plurality of couplers 10 can be fully expanded to connect the upright support tubes 41, the horizontal support tubes 42, the top tube 43, the bottom tube 44, and the two support tubes 47 of the upper frame 46 as shown in FIG. 10. The two upper couplers 10 can be folded from the position as shown in FIG. 10 to the position as shown in FIG. 11, thereby folding the upper frame 46.

It should be clear to those skilled in the art that further embodiments may be made without departing from the scope of the present invention.

What is claimed is:

1. A coupler for a sport practice net rack comprising:

a first angular tube (20) having a first flat section (21) and a first angular section (22); and a second angular tube (30) pivotally mounted on said first angular tube (20) and having a second flat section (3 1) and a second angular section (32), said second angular section (32) of said second angular tube (30) detachably received in said first angular section (22) of said first angular tube (20); wherein, said first angular section (22) of said first angular tube (20) defines a locking slot (220), and said second angular section (32) of said second angular tube (30) includes an elongated flexible piece (320) having a press button (322) detachably secured in said locking slot (220) of said first angular section (22) of said first angular tube (20); and said second angular section (32) of said second angular tube (30) defines two elongated slits (324) spaced from each other, thereby defining said elongated flexible piece (320).

2. The coupler in accordance with claim 1, wherein said second flat section (31) of said second angular tube (30) is provided with an annular shoulder (310). and said first angular section (22) of said first angular tube (20) has an abutting edge (222) rested on said annular shoulder (310) of said second flat section (31) of said second angular tube (30) when said press button (322) of said flexible piece (320) of said second angular section (32) of said second angular tube (30) is secured in said locking slot (220) of said first angular section (22) of said first angular tube (20).

3. The coupler in accordance with claim 1, wherein said first angular tube (20) includes two spaced support ears (23), said second angular tube (30) includes a pivot ear (33) pivotally mounted between said two support ears (23), and said coupler further comprises a pivot axle (12) extending through said two support ears (23) and said pivot ear (33) so that said second angular tube (30) is pivotally mounted on said first angular tube (20).

4. The coupler in accordance with claim 1, further comprising an extension tube (26) integrally extending from said first angular section (22) of said first angular tube (20).

* * * * *